United States Patent [19]
Heflich

[11] 3,713,570
[45] Jan. 30, 1973

[54] MEANS FOR CUTTING GLASS TUBES
[75] Inventor: Henry G. Heflich, Ridgefield, N.J.
[73] Assignee: Kahle Engineering Co., Union City, N.J.
[22] Filed: Sept. 17, 1971
[21] Appl. No.: 181,477

[52] U.S. Cl. .................................................. 225/93.5
[51] Int. Cl. .................................................. B26f 3/06
[58] Field of Search .................. 225/93.5, 2, 96.5, 96

[56] References Cited

UNITED STATES PATENTS

| | | | |
|---|---|---|---|
| 1,508,358 | 9/1924 | Brown | 225/93.5 |
| 2,310,469 | 2/1943 | Snyder | 225/93.5 |
| 2,641,870 | 6/1953 | Eisler | 225/93.5 |
| 2,986,845 | 6/1961 | Spicer | 225/93.5 |

Primary Examiner—Frank T. Yost
Attorney—Norman N. Holland

[57] ABSTRACT

An improved means is disclosed for cutting glass tubes at a precise position and with an evenly cut end. The device may be used alone as a glass tube cutter or it may be incorporated in a larger glass forming machine at a separate tube cutting station. The tube cutter has a crack-off wheel rotatably mounted on an axis parallel to the axis of the glass tube being cut. This wheel has a capillary groove in its rim which holds a bead of water below a dry projecting wheel edge. The rotating crack-off wheel brings the bead of water into contact with the heated glass tube resulting in a precisely positioned and even cut or crack-off of the glass tubing at the point contacted by the water bead.

10 Claims, 9 Drawing Figures

INVENTOR.
HENRY G. HEFLICH
ATTORNEY

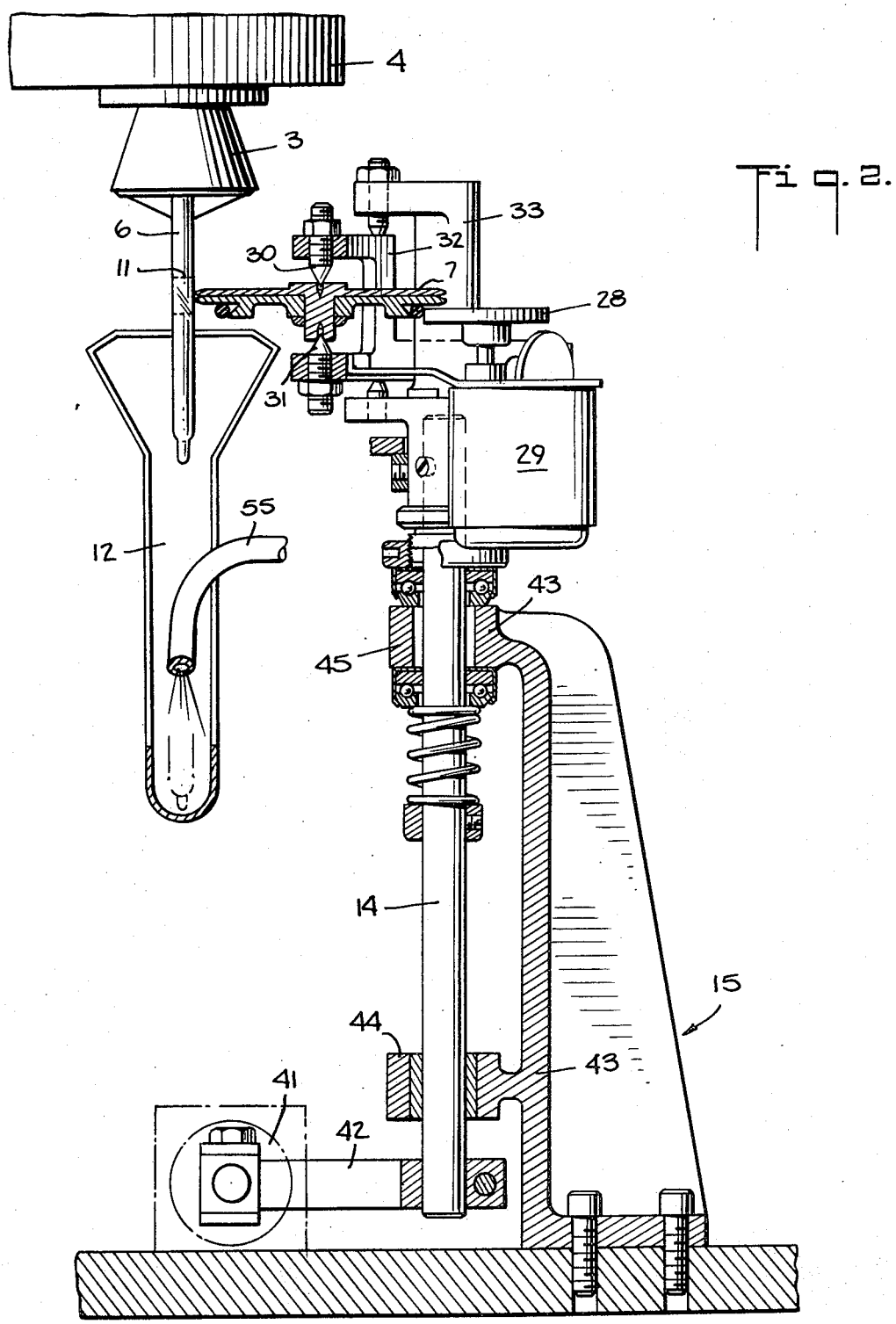

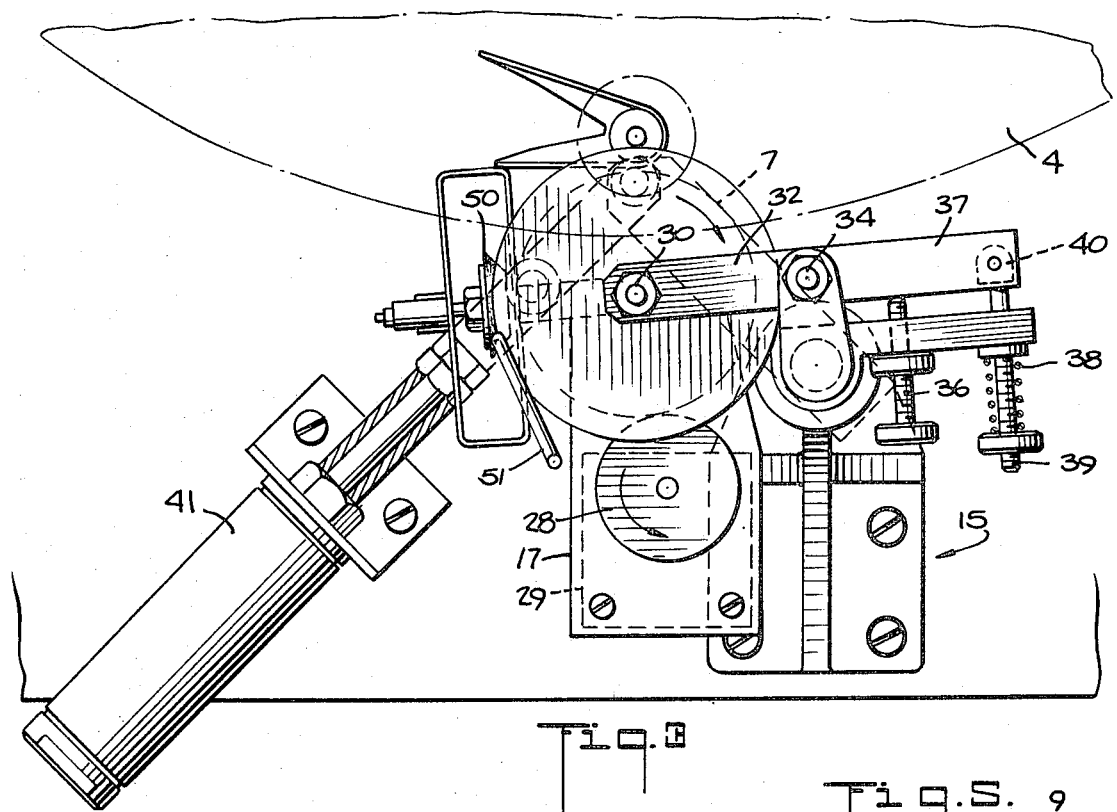
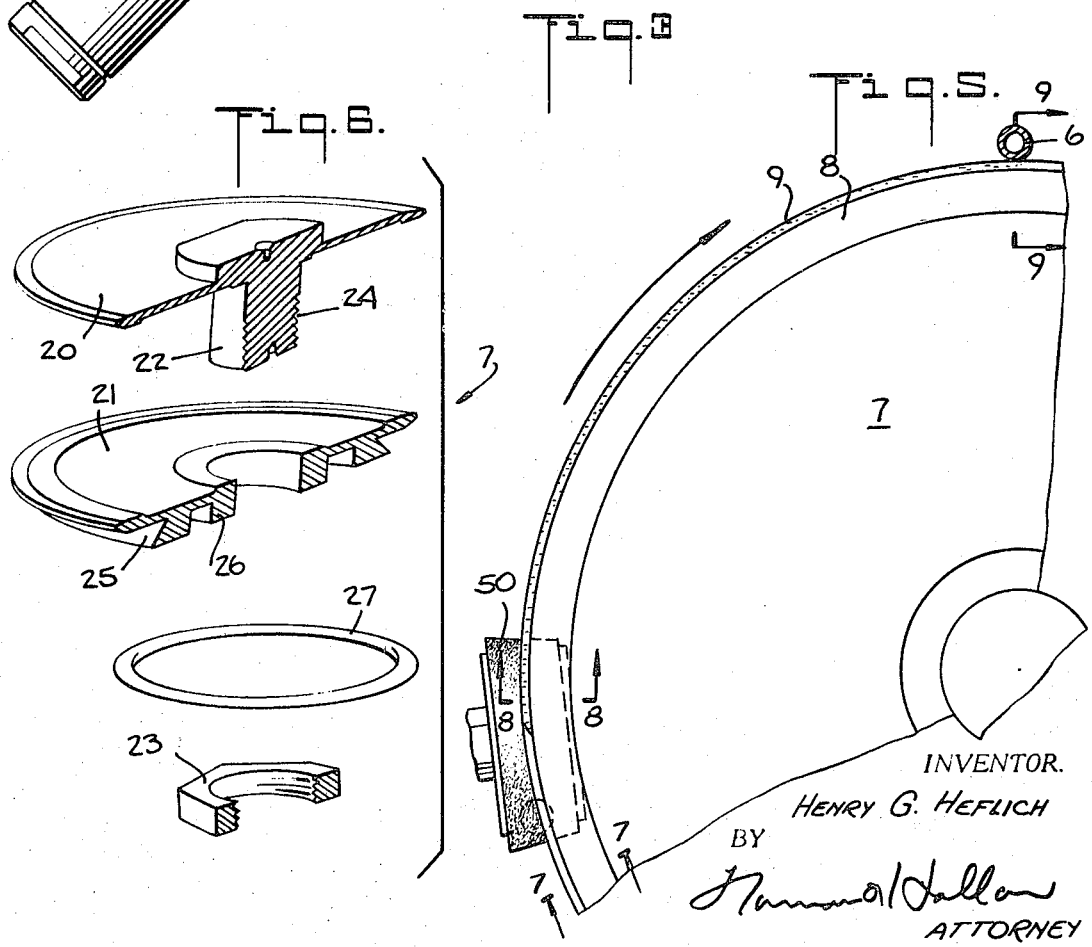

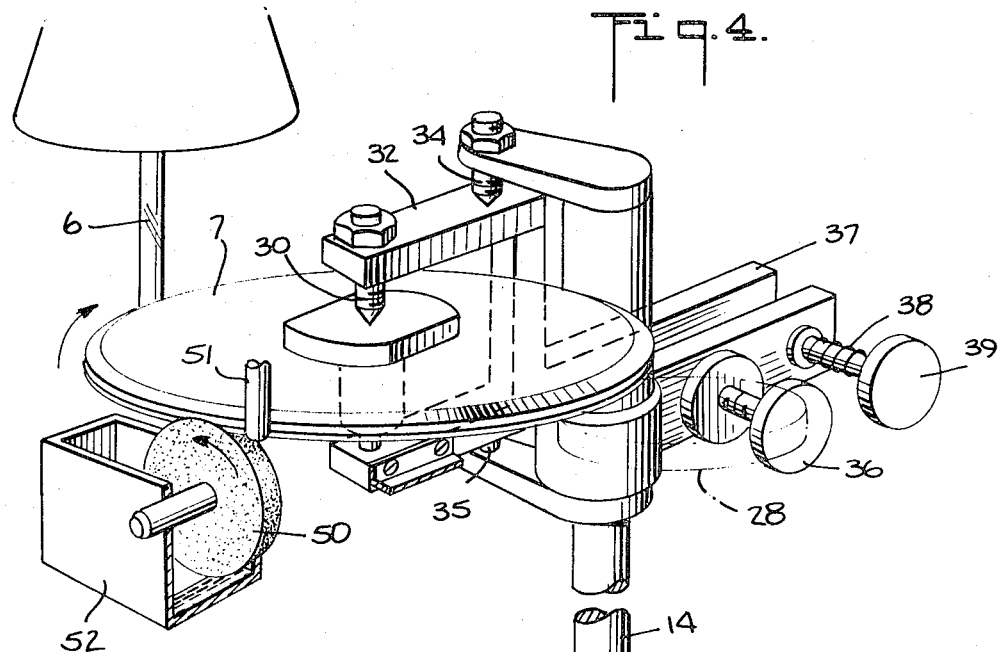
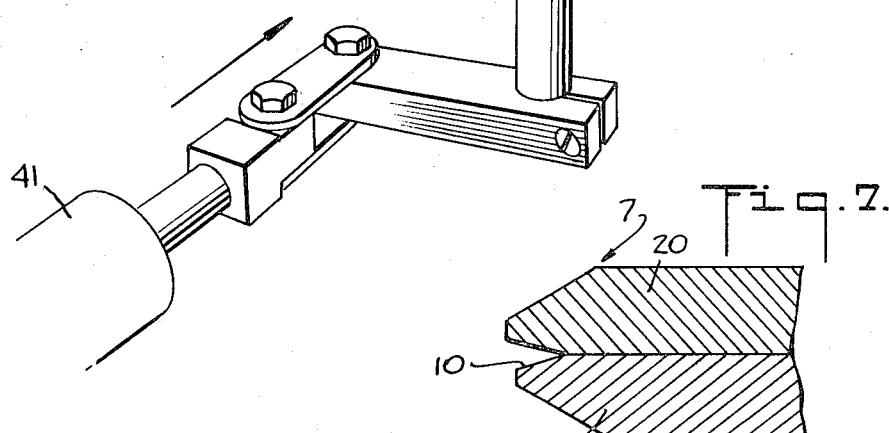
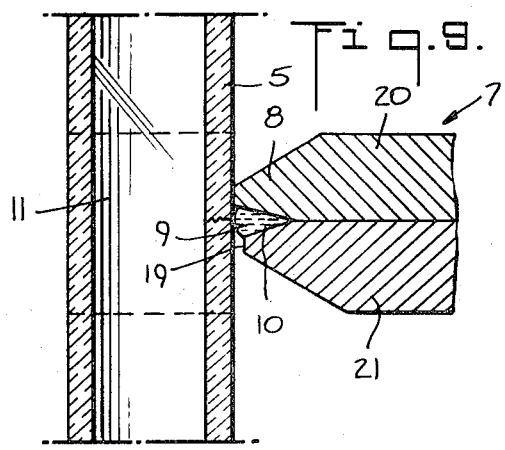
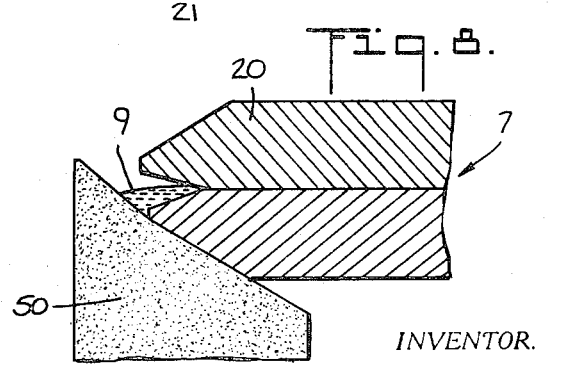

MEANS FOR CUTTING GLASS TUBES

BACKGROUND OF THE INVENTION

The present invention relates to an improved crack-off device for cutting or cracking glass tubes at a precise position and with an even cracked-off end. More particularly, the invention relates to an improved means utilizing a water bead for cracking off glass tubes including tubes formed of a relatively hard glass formulation such as borosilicate tubes.

A variety of crack-off devices have been used independently or in a crack-off station in glass forming machinery. These prior devices used various types of heating flames combined with knives or wheels for physically engaging and for cracking off the glass tubing. Such prior devices have proven generally effective for soft glass particularly where the shape of the crack and its position need not be precisely controlled.

Certain glass forming operations on glass tubing, however, require the cracking or cutting operation to be performed at a precise physical position on the tubing. Others are used on borosilicate and other hard glass formulations where the crack-off operation has been found to be difficult with known crack-off devices. The crack-off device of the present invention operates not only with hard glass formulations such as borosilicate ones but it also provides for a precise positioning of the crack off as well as for an evenly shaped tube end.

SUMMARY OF THE INVENTION

The improved device utilizes a thin circular bead of water supported within a capillary groove in a rotating wheel. This wheel is arranged so that the only water engaging the glass tube is the water bead itself and so that the position of the bead is precisely located at the desired crack-off line.

Accordingly, an object of the present invention is to provide an improved glass tube crack-off device.

Another object of the present invention is to provide an improved method of cracking off glass tubing.

Another object of the present invention is to provide an improved method and means for cracking off relatively hard glass tubing including borosilicate glass and other hard glass formulations.

Another object of the present invention is to provide a glass tube crack-off method and means providing a precise positioning of the crack off.

Another object of the present invention is to provide an improved glass tubing crack off combining reliable operation with a relatively simple cracking means.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings, forming a part of the specification, wherein:

FIG. 2 is a side elevational view partially in section illustrating the crack-off device of FIG. 1.

FIG. 3 is a top plan view of the crack-off device.

FIG. 4 is an enlarged perspective view illustrating a preferred embodiment of the crack-off wheel and its mounting.

FIG. 5 is an enlarged detailed view of the crack-off wheel and the capillary water bead.

FIG. 6 is an exploded perspective view of a preferred embodiment of a crack-off wheel.

FIGS. 7, 8 and 9 are enlarged detailed sectional views illustrating the filling and use of the capillary water bead in the cracking operation.

DESCRIPTION OF THE PREFERRED EMBODIMENT

Figure 1:
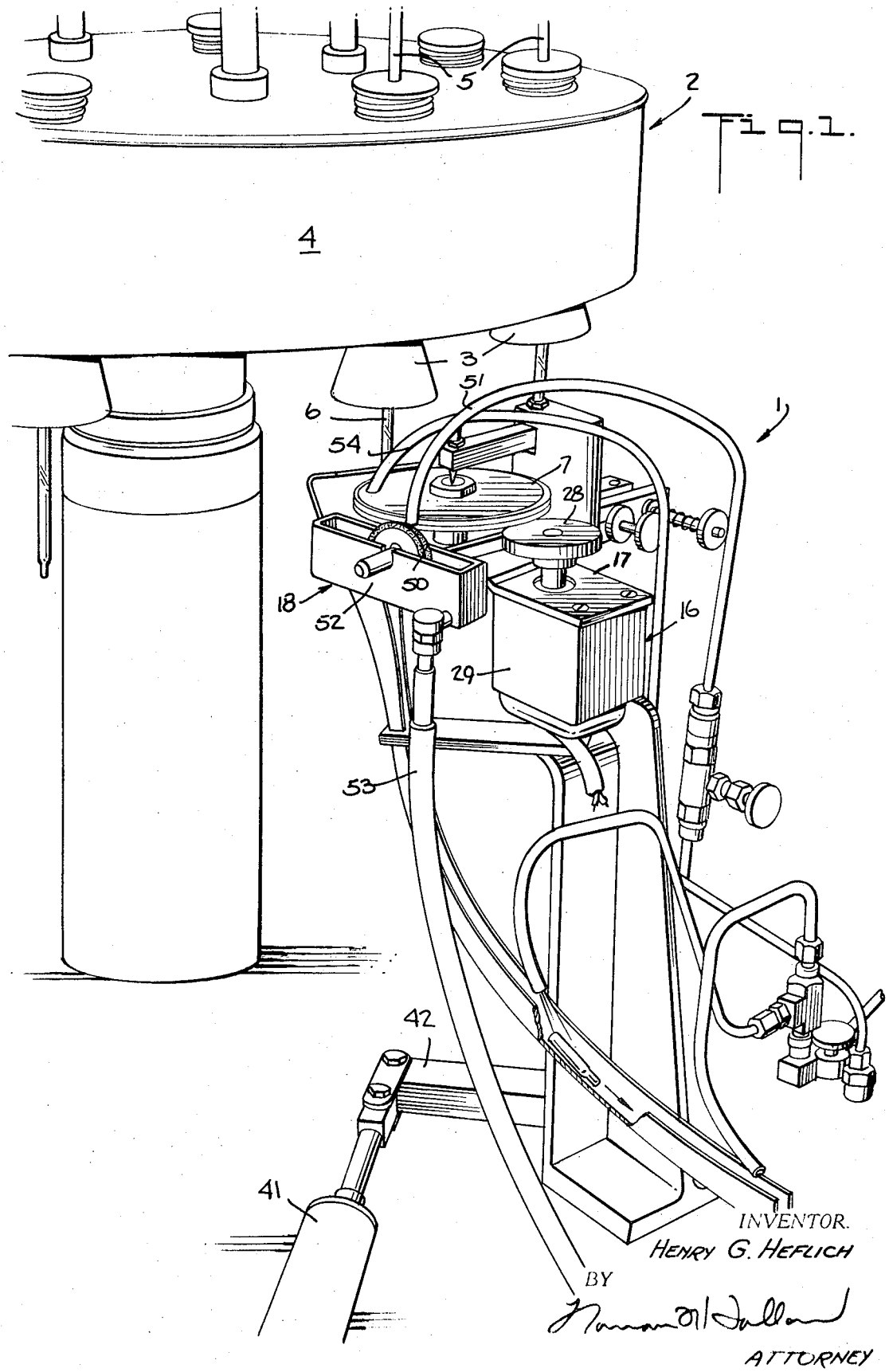
FIG. 1 is a perspective view illustrating a preferred embodiment of the crack-off device in accordance with the present invention as utilized on a typical automatic glass forming machine.

The improved crack-off device and method will first be described generally with particular reference to FIGS. 1 through 3.

The crack-off device 1 may be utilized independently in a tube cracking operation or it may be incorporated as one of the stations of a glass forming machine such as the turret-type machine 2 illustrated in FIG. 1. In this machine 2, a number of glass tube supporting chucks 3 are mounted at the edge of a turret 4, which moves the chucks 3 past a number of glass forming stations including a crack-off station including a crack-off device 1 of the type illustrated in FIG. 1. An example of such a machine is one for forming hypodermic syringes. Such syringes are often made of a hard borosilicate glass. The lower end of a glass tube 5 is supported in the chuck 3 and is formed with a tapered end 6 using appropriate heating and shaping tools at various work stations. Thereafter, this shaped portion 6 of the tube must be cut or severed from the tube 5 as the syringe is completed on other apparatus. It is necessary for the cutting operation in this case to form the cut at a precise position as well as to form an evenly cut end thereby eliminating the need for further grinding or polishing operations on the cut end. Even of more importance, this cutting or severing operation has to result in a precise and square cut at the end of the long glass length which is still held in the chuck since this end is subsequently tooled into the formed end of the glass product. A precise and square cut is critical for this tooling since it materially affects the tolerances on the formed end of the glass product.

The crack-off device 1 of the present invention will be described in connection with such a typical glass forming operation although it is clear that it is useful in a wide variety of other tube cutting operations.

FIG. 2 shows the lower end 6 of the glass tube 5 after it has been shaped and has been moved by the turret 4 in a chuck 3 to the glass cutting station employing a crack-off device 1 in accordance with the present invention. At this station, it is desired that the glass tubing 5 be cut at a precise line and with a flat or square and evenly cut end to separate the partially completed syringe body from the remainder of the glass tube 5. The turret 4, as seen in FIGS. 1 through 3, has carried the chuck 3 with its supported tube 5 to a position adjacent the crack-off wheel 7 of the crack-off device 1. The crack-off wheel 7 rotates and is moved against the glass tube 5 as the glass tube 5 is moved to this crack-off position by a drive means which will be further described below. The grooved periphery of the crack-off wheel 7 has an upper edge 8 (FIGS. 2 and 9) which is dry and which lightly engages the rotating glass tubing 5 while a bead of water 9 positioned in the capillary groove 10 and below the upper edge 8 engages a heated band 11 on the tube 5 causing it to crack at the contacted position which is rotated within a few thousands of an inch axially of the glass tube 5. The cracked-off portion 6 drops into a guide chute 12 provided at the crack-off station which conducts the partially completed glass article to an outlet for further processing, if required.

As seen in FIG. 1, the crack-off device 1 is mounted at the edge of the rotating turret 4 so that the crack-off wheel 7 may be moved into proximity with the glass tubes 5 supported in the chucks 3. The crack-off device comprises the rotating crack-off wheel 7 movably mounted on a generally vertical support shaft 14 (FIG. 2) in a frame 15 so that it may be moved automatically and in a repetitive cycle towards and away from the glass tubes 5 in the chucks 3. The wheel 7 is continuously rotated by an electric drive motor system 16 attached to the wheel support by a bracket 17 (FIG. 1). The bead of water 9 which is described above, is used for the crack-off action, is formed on the rotating crack-off wheel 7 by a water supply system 18 (FIG. 1).

The details of the preferred embodiment of these elements will now be described.

The Crack-Off Wheel

The preferred embodiment of the crack-off wheel 7 is illustrated in detail in FIGS. 5 through 9. The capillary groove 10 which attracts and holds the bead of water 9 as illustrated in FIG. 9 is conveniently formed at the oppositely beveled edges 8 and 19 of upper and lower wheel portions 20 and 21. The portions 20 and 21 are seen to comprise relatively thin circular discs having flat facing surfaces which fit together when the wheel 7 is assembled on its circular hub 22 as a nut 23 is tightened on the hub threads 24. When the upper and lower portions 20 and 21 of the wheel 7 are thus assembled, the groove 10 having a V-shape in cross section is seen to be formed at the outer edge of the wheel as defined by the beveled facing edges of the upper and lower wheel portions 20 and 21. This groove is given capillary proportions so that the groove 10 will attract and hold a bead 9 of water as the water is fed to the groove by the water supply means. For a wheel 7 which is a few inches in diameter, a satisfactory groove 10, as seen in FIG. 7, will have an angle A of about 20° and a width at its outer edge of about 0.030 inches.

As will be more fully described below, the water is preferably fed upwardly into the groove 10 over the outer edge 19 of the lower portion 21 of the wheel 7. The upper wheel portion 20, therefore, is formed with a slightly greater diameter causing its edge 8 to extend outwardly above the groove 10 and edge 19 of the lower wheel portion 21. This relative arrangement of the wheel edges permits the upper edge 8 to remain dry so that it may be used as a reference or guide surface in engaging the glass tube 5 during the crack-off, thereby precisely positioning the rounded edge of the water bead at the precise position crack-off line desired on the glass tube 5.

The lower portion 21 of the wheel 7 preferably has a groove 25 in its lower flange 26 for mounting a rubber ring 27 which is used to drive the wheel when engaged by a pulley 28 on the crack-off wheel 7 drive motor 29. The crack-off wheel 7 is mounted between a pair of adjustably positioned conical bearings 30 and 31 which are themselves threadedly connected to a support bracket 32. The adjustable wheel supporting frame 15 will now be described.

The Wheel Mounting Frame

As indicated above, the crack-off wheel 7 with its bead of water 9 is mounted on and is moved into cracking position by its support frame 15. The wheel support frame 15 includes the generally horizontal support bracket 32 which is adjustably positioned on a vertical support shaft 14 by a yolk 33. A pair of conical bearings 34 and 35 pivotally engage the support bracket 32 and permit the position of the wheel 7 to be horizontally adjusted by means of a threaded stop wheel 36 (FIG. 3) on the yoke arm 37 acting against the force of a compressed coil spring 38. Spring 38 acts against the support bracket 32 through a spring rod 39 pivotally connected to the support bracket at 40. It is seen that an extremely fine adjustment of the wheel 7 position may be made by the use of the threaded stop wheel 36 to rotate the crack-off wheel 7 support bracket 32 on its mounting bearings 34 and 35 so that a fine adjustment of the final crack-off position of the wheel 7 may be made. It is also seen that the wheel 7 will yield if necessary when it engages a tube 5 as its support bracket 32 swings against the force of spring 38.

The crack-off wheel 7 is moved to and from the crack-off position illustrated in FIGS. 2 and 3 by means of a drive cylinder 41 operatively coupled to the vertical support shaft 14 through the intermediation of a suitable crank arm 42. The vertical shaft 14 is mounted on a main support post 43 in spaced bearings 44 and 45. The drive cylinder 41, which may be air or fluid driven, has its control valve coupled to a suitable timing cam to swing the crack-off wheel 7 to its crack-off position when a glass tube 5 has been presented by a chuck 3 to the crack-off position.

The Water Supply

As described above, the preferred crack-off wheel 7 applies a dry wheel edge 8 to the glass tube 5 to be cracked thereby precisely positioning the bead of water 9 with respect to the glass tube 5. The water supply is fed into the capillary groove 10 by a means which leaves the guiding edge 8 of the crack-off wheel dry.

A preferred means for forming the water bead 9 in this manner is illustrated in FIGS. 4, 5 and 8. The water supply means includes a feed wheel 50 having a felt body or surface which absorbs a water supply from a water feed tube 51. The wheel 50, as illustrated in FIG. 8, is positioned to engage the lower beveled edge 19 only of the crack-off wheel 7 so as to be rotated by it thereby continuously pressing or forcing the water in the direction of the capillary groove 10 and permitting the capillary action of the groove to form the water bead 9 in the manner illustrated in FIGS. 5 and 9. A catch basin 52 is provided beneath the water wheel 50 to drain any excess water through a drain 53.

An air tube 54 having its end positioned to direct a stream of air over the wheel edge 8 prevents the presence of water above the desired water bead 9 formulation.

An air tube 55 at the chute 12 assists the passage of cut tube ends 6 away from the crack-off station.

It will be seen that an improved crack-off device is provided for cracking or severing glass tubes at precise positions and with even and smoothly cracked-off ends. The device obtains these improved results through the use of a novel cracking wheel including a precisely positioned water bead. The new crack-off wheel arrangement is provided in a convenient and adjustable mounting means which makes the system suitable both for use as a separate glass tube crack-off machine or alternatively for use as a crack-off station as a portion of a larger glass tube forming machine. The improved crack-off device is relatively simple and rugged in form and provides a reliable and maintenance-free crack-off device for use on high speed precision glass forming machines.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An improved crack-off means for glass tubing comprising the combination of:
   a crack-off wheel;
   means for rotating the crack-off wheel; and
   means for forming a circular bead of water on the wheel edge including a capillary groove and means for feeding water into the groove to form the bead.

2. The crack-off means as claimed in claim 1 in which the edge of said crack-off wheel on one side of said capillary groove extends radially outwardly further than the edge of said crack-off wheel on the other side of said groove.

3. The crack-off means as claimed in claim 2 in which said further extending edge comprises an upper edge and the water feeding means supplies water over the lower wheel edge.

4. The crack-off means as claimed in claim 3 which further comprises means for blowing excess water from the edge of said crack-off wheel.

5. The crack-off means as claimed in claim 1 which further comprises mounting means for said wheel including means for yieldably urging said wheel toward the glass tubing, and adjustable stop means to determine the position of greatest wheel movement toward the tubing.

6. The crack-off means as claimed in claim 1 in which said water feeding means comprises a water absorbent wheel having its edge engaging said crack-off wheel adjacent said capillary groove, and a conduit for supplying water to said absorbent wheel.

7. An improved crack-off means for generally vertically held glass tubing comprising the combination of:
   a horizontal positioned crack-off wheel;
   means for rotating the crack-off wheel;
   means for forming a circular bead of water on the wheel edge including a capillary groove;
   means for feeding water into the groove to form a self-supporting bead;
   the upper edge of said crack-off wheel above said groove extending radially outwardly beyond the lower edge of said crack-off wheel below said groove; and
   said water feeding means comprising a water absorbent wheel engaging the lower edge of said crack-off wheel and means supplying water to said water absorbent wheel.

8. The crack-off means as claimed in claim 7 which further comprises means for blowing excess water from said crack-off wheel.

9. The crack-off means as claimed in claim 7 which further comprises mounting means for said wheel including means for yieldably urging said wheel toward the glass tubing, and adjustable stop means to determine the position of greatest wheel movement toward the tubing.

10. The crack-off means as claimed in claim 7 in which said water feeding water absorbent wheel has its edge engaging said crack-off wheel below said capillary groove.

* * * * *